Sept. 12, 1967  E. A. SAVAGE  3,340,639
VEHICLE LICENSE PLATE HOLDER AND LOCKING MEANS
Filed April 27, 1965
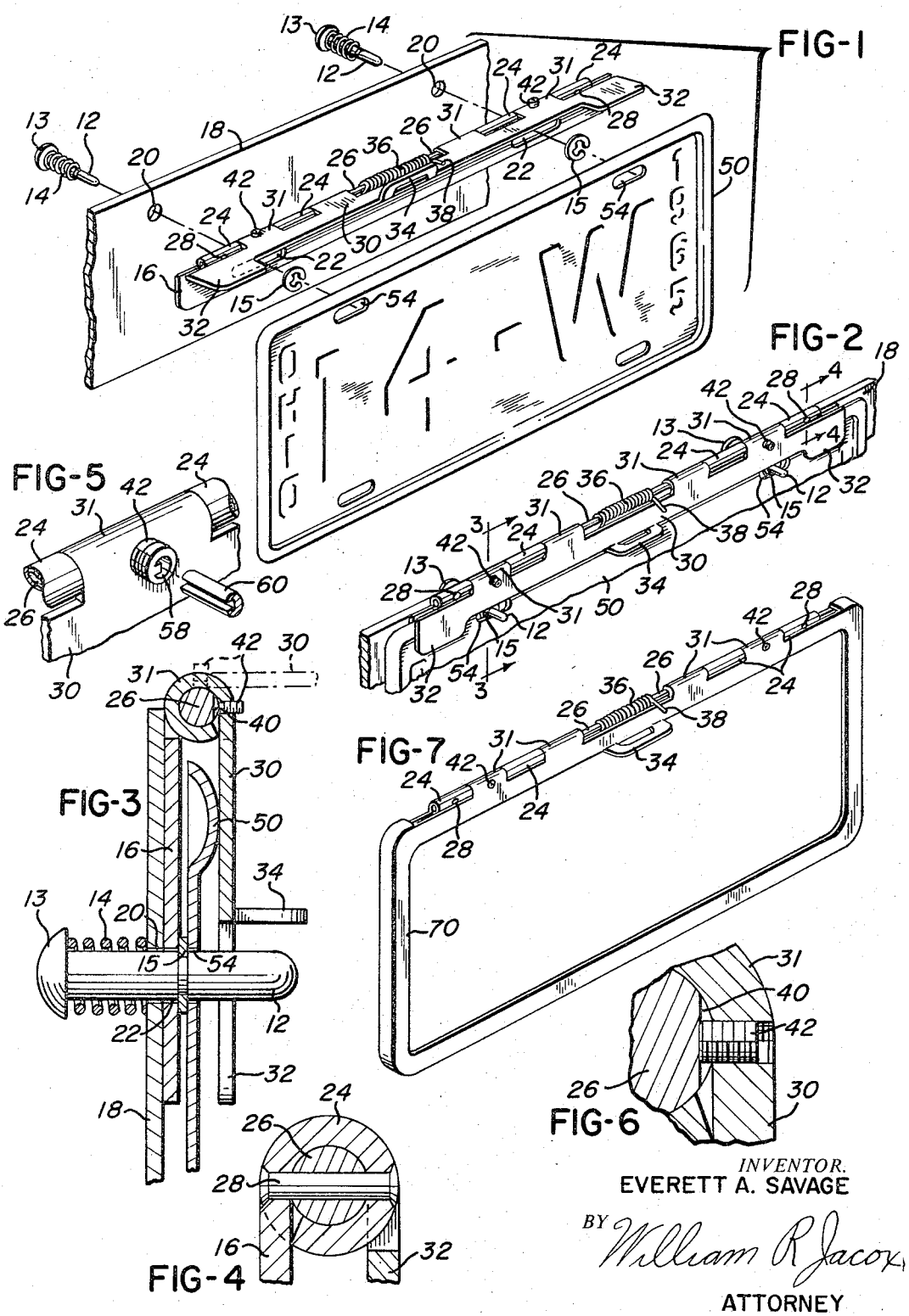
INVENTOR.
EVERETT A. SAVAGE
BY William R Jacox,
ATTORNEY

3,340,639
VEHICLE LICENSE PLATE HOLDER AND LOCKING MEANS
Everett A. Savage, R.R. 1, Spring Valley, Ohio 45370
Filed Apr. 27, 1965, Ser. No. 451,172
8 Claims. (Cl. 40—209)

ABSTRACT OF THE DISCLOSURE

This invention relates to a vehicle license plate holder and locking means for securing the license plate to a vehicle.

Background of the invention

It is an object of this invention to provide a vehicle license plate holder by which a license plate can be easily and readily attached to a vehicle.

Another object of this invention is to provide a license plate holder by which a license plate can be locked to a vehicle.

Other objects and advantages reside in the construction of parts, the combination thereof, the method of manufacture, and the mode of operation, as will become more apparent from the following description.

In the drawing:

FIGURE 1 is a perspective exploded view of a license plate holder of this invention and a license plate for retention thereby, showing elements of the license plate holder in position to receive the license plate.

FIGURE 2 is a fragmentary perspective view showing the license plate holder with a license plate retained thereby. This figure shows the locking means of this invention in an unlocked condition.

FIGURE 3 is an enlarged sectional view taken substantially on line 3—3 of FIGURE 2.

FIGURE 4 is an enlarged sectional view taken substantially on line 4—4 of FIGURE 2.

FIGURE 5 is an enlarged fragmentary perspective view of a portion of the license plate holder as viewed in FIGURE 2, showing locking means and key means therefor.

FIGURE 6 is an enlarged fragmentary sectional view of the upper portion of FIGURE 3 but showing the locking means thereof in a locking position.

FIGURE 7 is a perspective view of a license plate holder of this invention showing a modification in a portion thereof.

Referring to the drawing in detail, a license plate holder of this invention comprises an elongate support member or strip 16 which is adapted to be attached to a portion or part 18 of a vehicle. The part 18 may be a bumper of a vehicle or any other portion or part thereof to which a license plate may be attached. The part 18 is shown as being provided with holes or apertures 20.

The support member 16 is provided with slots 22. A portion of each of the slots 22 is in alignment with one of the holes or apertures 20 of the part 18. Preferably, the support member 16 is attached to the part 18 by means of studs 12, each of which has a head 13. Each stud 12 extends through one of the holes 20 of the part 18 and through the slot 22 aligned therewith.

The part 18 to which the support member 16 is attached may be of considerable thickness or the part 18 may have slight thickness. Each stud 12 has considerable length so that the stud 12 will extend through a part 18 which may be of considerable thickness. Each stud 12 also is adapted for use with a part 18 which may have slight thickness. A spring 14 encompasses each stud 12 and is disposed between the head 13 and the rear surface of the part 18. A clip 15 is attached to each stud 12 intermediate the ends thereof and exterior of the support member 16. The spring 14 urges the clip 15 into engagement with the support member 16 so that the support member 16 is retained in firm engagement with the part 18.

The upper edge portion of the strip 16 has attached thereto or integral therewith a plurality of spaced-apart arcuate knuckles 24. Extending through the knuckles 24 is a rod 26. The rod 26 is secured to the knuckles 24 by any suitable means. Herein a pin member 28, shown in FIGURES 1, 2, 4, and 7, extends through at least one knuckle 24 and through the rod 26 and secure the rod 26 with respect to the knuckles 24 and prevents relative movement between the rod 26 and the knuckles 24.

A clamping member or strip 30 has spaced-apart knuckles 31 encompassing the rod 26 for rotative movement thereabout so that the clamping member 30 is hingedly attached to the support member 16. The clamping member or strip 30 is shown as having lateral extensions or lugs 32 adjacent the ends thereof. The clamping member 30 also has a tab 34 at the central portion thereof, substantially normal thereto.

A helical spring 36 encompasses the rod 26 and has one end thereof secured by any suitable means (not shown) against movement with respect to the support member 16. The spring 36 also has an end 38 which engages the clamping member 30 and urges pivotal movement of the clamping member 30 toward the support member 16.

The rod 26 has one or more flat surface portions 40, as shown in FIGURES 3 and 6. Each knuckle 31 which is adjacent a flat surface portion 40 has a set screw or locking member 42 threadedly carried thereby. FIGURE 3 shows the locking member 42 spaced from the flat portion 40 of the rod 26 so that the knuckle 31 and the clamping member 30 can be pivotally moved with respect to the rod 26 and the support member 16. The locking member 42 is also threadedly movable into juxtaposition with the flat surface portion 40, as shown in FIGURE 6, to lock the knuckle 31 and the clamping member 30 against pivotal movement with respect to the rod 26 and the support member 16.

For attachment of a license plate 50 to a license plate holder of this invention the clamping member 30 is pivotally moved angularly with respect to the support member 16, as shown in FIGURE 1 and as shown in broken lines in FIGURE 3. The tab 34 may be manually gripped for moving the clamping member 30 to such angular position with respect to the support member 16. Such pivotal movement is against the forces of the spring 36. Then the license plate 50 is moved into engagement with the support member 16 as the studs 12 are disposed within slots 54 of the license plate 50. Then the clamping member 30 is permitted to pivotally move toward the support member 16 to the position shown in FIGURES 2 and 3. The clamping member 30 and the support member 16 cooperate to clamp the license plate 50. Thus, the license plate 50 is retained upon the studs 12 and between the clamping member 30 and the support member 16.

Then each set screw or locking member 42 is threadedly moved into juxtaposition with the flat surface portion 40 of the rod 26, as shown in FIGURE 6.

Preferably, the set screw or locking member 42 is provided with a specially formed recess 58, as shown in FIGURE 5 so that a special key member or tool 60 is required for rotative movement of the set screw or locking member 42. Thus, the clamping member 30 is locked against rotative movement with respect to the rod 26. Due to the fact that the rod 26 is nonrotatable with respect to the support member 16, as shown in FIGURE 4, the clamping member 30 is retained against movement with respect to the support member 16 when the set screw 42 is positioned adjacent the flat surface 40 of the rod 26 as shown in FIGURE 6. Therefore, when the set screw or locking member 42 is positioned in juxtaposition with the flat surface 40 of the rod 26, as shown in FIGURE 6, the license plate 50 is secured to the support member 16.

Due to the fact that the clips 15 are attached to the studs 12 and are positioned between the license plate 50 and the support member 16, the license plate 50 covers the clips 15. Therefore, the studs 12 cannot be removed from the part 18 while the license plate 50 is retained by the studs 12 and by the clamping member 30. Thus, the locking member 42 not only locks the license plate 50 to the support member 16, but the support member 16 is also locked to the part 18.

FIGURE 7 shows a modification in which a clamping member 70 is in the form of an annular frame adapted to engage the periphery of a license plate, such as the license plate 50.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. A license plate holder for a license plate provided with apertures and adapted to be attached to a part of a vehicle comprising:
   a support member provided with spaced-apart apertures, the support member having an edge portion,
   a plurality of knuckles secured to the support member at the edge portion thereof,
   a rod extending through the knuckles and secured with respect thereto so that the rod is nonrotatable with respect to the knuckles,
   a clamping member, the clamping member having an edge portion provided with a plurality of knuckles, the knuckles of the clamping member encompassing a portion of the rod for rotative movement with respect thereto,
   stud means disposable within the apertures of the support member and disposable within the apertures of a license plate aligned therewith when the license plate is positioned intermediate the support member and the clamping member,
   the clamping member thus retaining the license plate with respect to the support member and with respect to the stud means,
   the rod having a flat portion adjacent at least one of the knuckles of the clamping member,
   a locking member threadedly carried by a knuckle of the clamping member and adjustably positionable to juxtaposition with the flat portion of the rod for locking the clamping member against rotation with respect to the rod, the locking member thus securing the license plate against movement from the stud means as the locking member secures the license plate intermediate the clamping member and the support member.

2. A license plate holder for a license plate provided with apertures and adapted to be attached to a part of a vehicle comprising:
   an elongate support member provided with spaced-apart apertures, the elongate support member having an edge portion,
   a plurality of knuckles secured to the edge portion of the elongate support member,
   a rod extending through the knuckles and secured with respect thereto so that the rod is nonrotatable with respect to the knuckles,
   a clamping strip, the clamping strip having an edge portion provided with a plurality of knuckles, each of the knuckles of the clamping strip encompassing a portion of the rod for rotative movement with respect thereto,
   the rod having a flat portion covered by at least one of the knuckles of the clamping strip,
   a locking member threadedly carried by the knuckle of the clamping strip and engageable with the flat portion of the rod for locking the clamping strip against rotative movement with respect to the rod, the locking member thus securing the rotative position of the clamping strip with respect to the support member when the locking member is in engagement with the flat portion of the rod,
   stud means disposable within the apertures of the elongate support member and disposable within the apertures of a license plate as the license plate is positioned between the support member and the clamping strip,
   and key means for threaded movement of the locking member to lock and to unlock the rotative position of the clamping strip with respect to the support member.

3. A license plate holder for a license plate provided with spaced-apart apertures, the license plate holder being adapted for attachment to a part of a vehicle in which the part has spaced-apart apertures, the part having a front side and a back side, the spaced-apart apertures of the license plate being alignable with the spaced-apart apertures of said part of the vehicle, comprising:
   a support member having spaced-apart apertures alignable with the spaced-apart apertures of said part of the vehicle,
   a plurality of stud members, there being one stud member for each of the spaced-apart apertures of said part of the vehicle, each stud member having a head at one end thereof, each stud member having a clip attachment portion intermediate the ends thereof, each stud member having the head thereof at the back side of said part of the vehicle, each stud member extending through an aperture of said part of the vehicle and through an aperture of the support member,
   a plurality of clips, there being a clip for each of the stud members, each clip being attached to the clip portion of its respective stud member, said part of the vehicle and the support member being intermediate the head of the stud member and the clip portion thereof,
   a plurality of spring members, there being one spring member encompassing each stud member intermediate the head thereof and the back side of said part of the vehicle so that the spring member urges the head of the stud in a direction away from the back side of said part of the vehicle,
   a clamping member pivotally carried by the support member, the clamping member being adapted to retain a license plate between the clamping member and the support member when the clamping member is in a given pivotal position with respect to the support member,
   each stud member having a portion adapted to receive a license plate as the stud member extends through an aperture of the license plate and as a portion of the license plate is disposed between the clamping member and the support member,
   and locking means for securing the pivotal position of the clamping member with respect to the support member so that the license plate is retained between the support member and the clamping member as the stud members extend through the license plate.

4. A license plate holder for a license plate provided with spaced-apart apertures comprising:
   a support member having spaced-apart apertures, the apertures of the license plate being alignable with the apertures of the support member, a plurality of studs, there being one stud extending through each of the apertures of the support member, each of the studs being adapted to extend through an aperture of the license plate, a plurality of attachment members, there being an attachment member attached to each of the studs adjacent the support member and preventing withdrawal of the stud from the support member, each attachment member being between the support member and the license plate as each stud extends through the license plate, a clamping member, means pivotally attaching the clamping member to the support member, the clamping member being pivotally movable to a position slightly spaced from the support member so that a portion of the license plate is clamped intermediate the clamping member and the support member as the studs extend through the apertures in the license plate, movement of the license plate from the studs thus being prevented, and locking means for securing the clamping member in said pivotal position slightly spaced from the support member in which position the license plate is clamped intermediate the clamping member and the support member.

5. A license plate holder of claim 4 in which the locking means includes a set screw member adjustably carried by the clamping member and engageable with the means pivotally attaching the clamping member to the support member.

6. A license plate holder of claim 4 in which the clamping member is in the form of a frame with parts in juxtaposition with peripheral portions of the license plate.

7. A license plate holder for a license plate having an aperture therethrough comprising:

a support member having a front side and a back side, the support member having an aperture therethrough, the support member being adapted to receive a license plate at the front side of the support member with an aperture of the license plate in alignment with the aperture of the support member, a stud extending through the aperture of the support member and through the aperture of the license plate, the stud having a head at the back side of the support member, the stud having an end portion spaced from the support member at the front side thereof, an attachment member attached to the stud at the front side of the support member and intermediate the head and said end portion thereof, the attachment member preventing withdrawal of the stud from the aperture of the support member, a clamping member pivotally attached to the support member, the clamping member being pivotally movable to a position substantially parallel to the support member so that a portion of the license plate is retained intermediate the support member and the clamping member as the stud extends through the aperture of the license plate, the distance between the end portion of the stud and the support member being at least as great as the distance between the support member and the clamping member when the clamping member is positioned substantially parallel to the support member so that the license plate cannot be removed from the stud while the clamping member is so positioned substantially parallel to the support member, and means for securing the clamping member in said position substantially parallel to the support member.

8. A holder for attaching a license plate to a portion of a vehicle comprising:

a support member, attachment means for attaching the support member to said portion of the vehicle, a clamping member pivotally attached to the support member for pivotal movement with respect thereto, the clamping member and the support member being adapted to retain a license plate therebetween when the clamping member is in a given pivotal position with respect to the support member, the attachment means including limit means limiting the movement of a license plate which is retained between the clamping member and the support member, the limit means limiting movement of the license plate in the plane of the license plate.

References Cited
UNITED STATES PATENTS

| 2,990,572 | 7/1961 | Schwartzberger | 16—191 |
| 3,178,762 | 4/1965 | Whiting | 16—191 |
| 3,187,452 | 6/1965 | Dotson | 40—209 X |

FOREIGN PATENTS

| 468,469 | 11/1928 | Germany. |
| 279,493 | 3/1952 | Switzerland. |

EUGENE R. CAPOZIO, Primary Examiner.

W. J. CONTRERAS, Assistant Examiner.